(12) United States Patent
Smith et al.

(10) Patent No.: US 10,476,115 B2
(45) Date of Patent: Nov. 12, 2019

(54) BATTERY CELL COOLING PLATE WITH CELL VENTS

(71) Applicant: NIO USA, Inc., San Jose, CA (US)

(72) Inventors: Alexander J. Smith, White Lake, MI (US); Austin L. Newman, San Jose, CA (US)

(73) Assignee: NIO USA, Inc., San Jose, CA (US)

( * ) Notice: Subject to any disclaimer, the term of this patent is extended or adjusted under 35 U.S.C. 154(b) by 28 days.

(21) Appl. No.: 15/610,137

(22) Filed: May 31, 2017

(65) Prior Publication Data

US 2018/0351219 A1 Dec. 6, 2018

(51) Int. Cl.
| | |
|---|---|
| *H01M 10/613* | (2014.01) |
| *H01M 2/10* | (2006.01) |
| *H01M 10/659* | (2014.01) |
| *H01M 10/6568* | (2014.01) |
| *H01M 10/653* | (2014.01) |
| *H01M 10/625* | (2014.01) |

(52) U.S. Cl.
CPC ....... *H01M 10/613* (2015.04); *H01M 2/1077* (2013.01); *H01M 10/625* (2015.04); *H01M 10/653* (2015.04); *H01M 10/659* (2015.04); *H01M 10/6568* (2015.04); *H01M 2220/20* (2013.01)

(58) Field of Classification Search
CPC .................................................. H01M 10/613
See application file for complete search history.

(56) References Cited

U.S. PATENT DOCUMENTS

| | | | |
|---|---|---|---|
| 2007/0134547 A1 | 6/2007 | Bouffard et al. | |
| 2009/0145219 A1 | 6/2009 | Champion et al. | |
| 2010/0136391 A1 | 6/2010 | Prilutsky et al. | |
| 2011/0189511 A1 | 8/2011 | Yoon | |
| 2013/0177791 A1 | 7/2013 | Takahashi et al. | |
| 2014/0057144 A1 | 2/2014 | Yang | |
| 2014/0234687 A1* | 8/2014 | Fuhr | H01M 2/1077 429/120 |
| 2016/0028059 A1 | 1/2016 | Sweney et al. | |
| 2017/0043194 A1 | 2/2017 | Ling | |
| 2018/0034122 A1 | 2/2018 | Newman | |
| 2018/0048037 A1 | 2/2018 | Newman | |
| 2018/0048039 A1 | 2/2018 | Newman et al. | |

FOREIGN PATENT DOCUMENTS

WO WO 2008/074034 6/2008

OTHER PUBLICATIONS

Official Action for U.S. Appl. No. 15/340,233, dated Aug. 13, 2018, 11 pages.
Official Action for U.S. Appl. No. 15/340,233, dated Apr. 16, 2018, 8 pages, Restriction Requirement.
Final Action for U.S. Appl. No. 15/340,233, dated Dec. 26, 2018, 15 pages.
Official Action for U.S. Appl. No. 15/340,233, dated May 23, 2019, 14 pages.

* cited by examiner

*Primary Examiner* — Matthew J Merkling
(74) *Attorney, Agent, or Firm* — Sheridan Ross P.C.

(57) ABSTRACT

Methods and systems for creating a battery module. A battery cell can include a vent in the bottom of the battery. To allow the battery to be attached to a cooling plate and allow the vent to function properly, an opening is formed in the cooling plate under the battery. The opening can vent gasses from the vent in the battery to atmosphere through a chamber in the cooling plate or a conduit in the cooling plate.

20 Claims, 14 Drawing Sheets

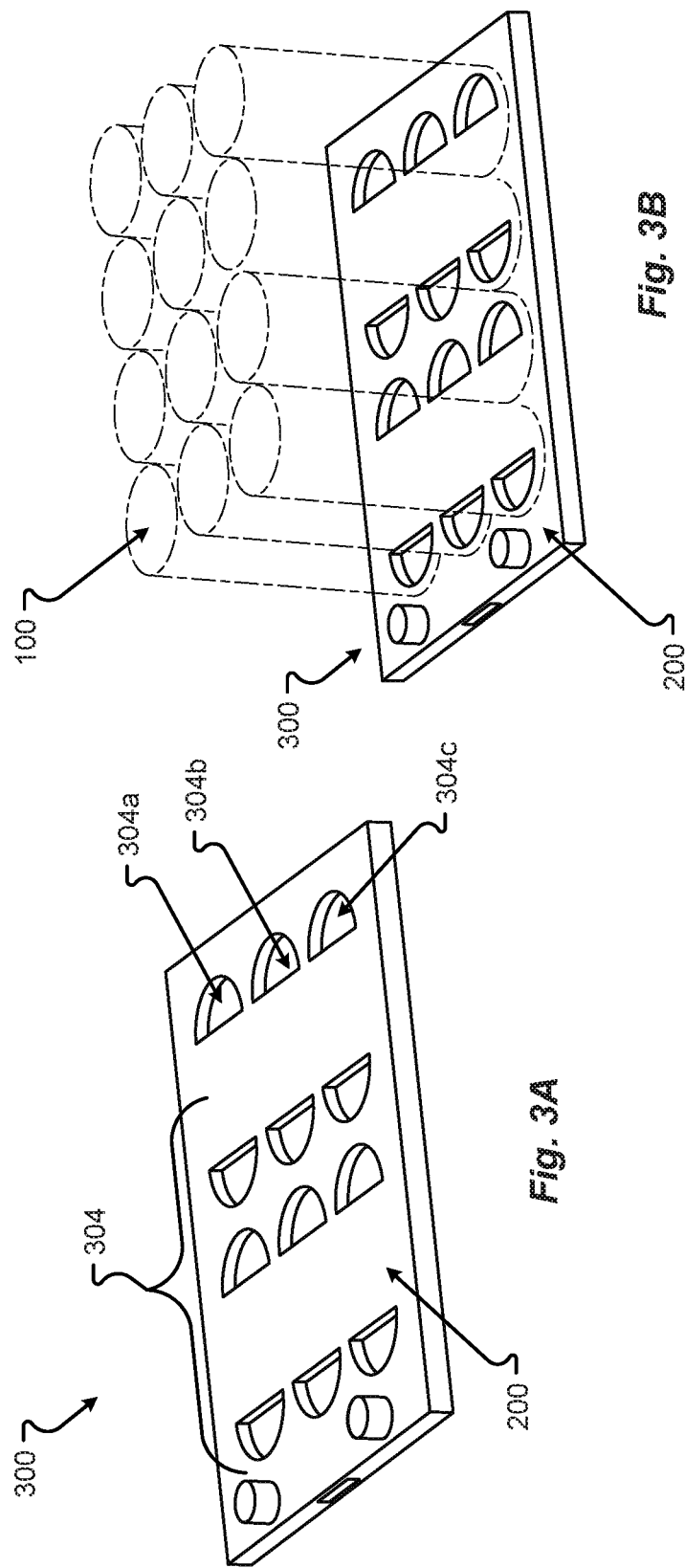

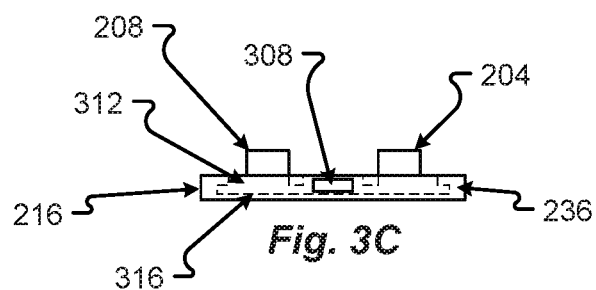
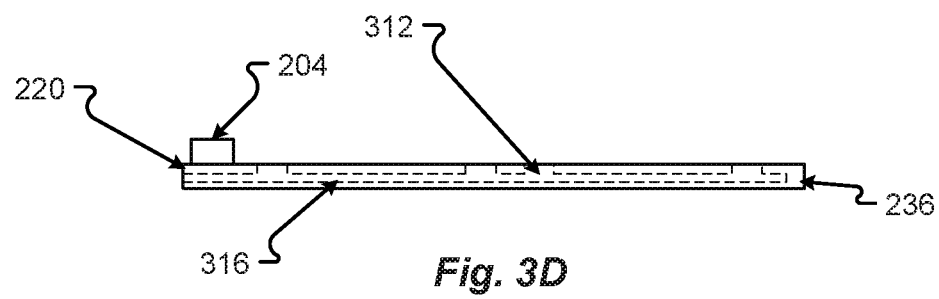
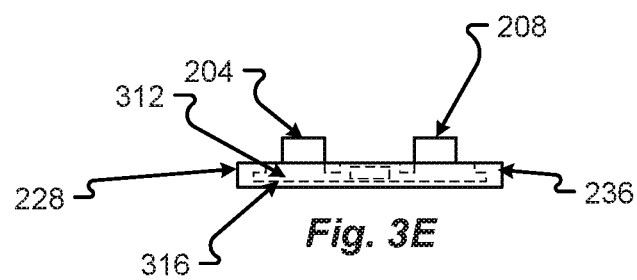
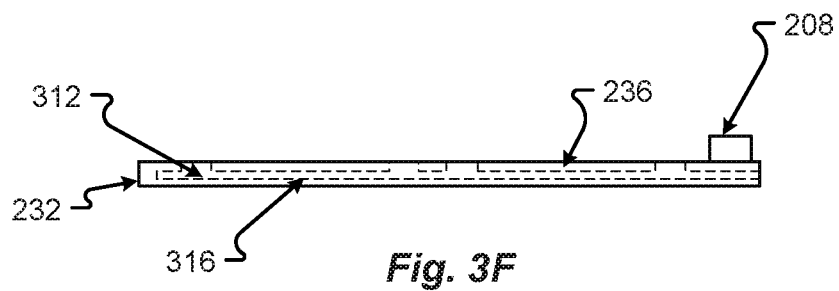

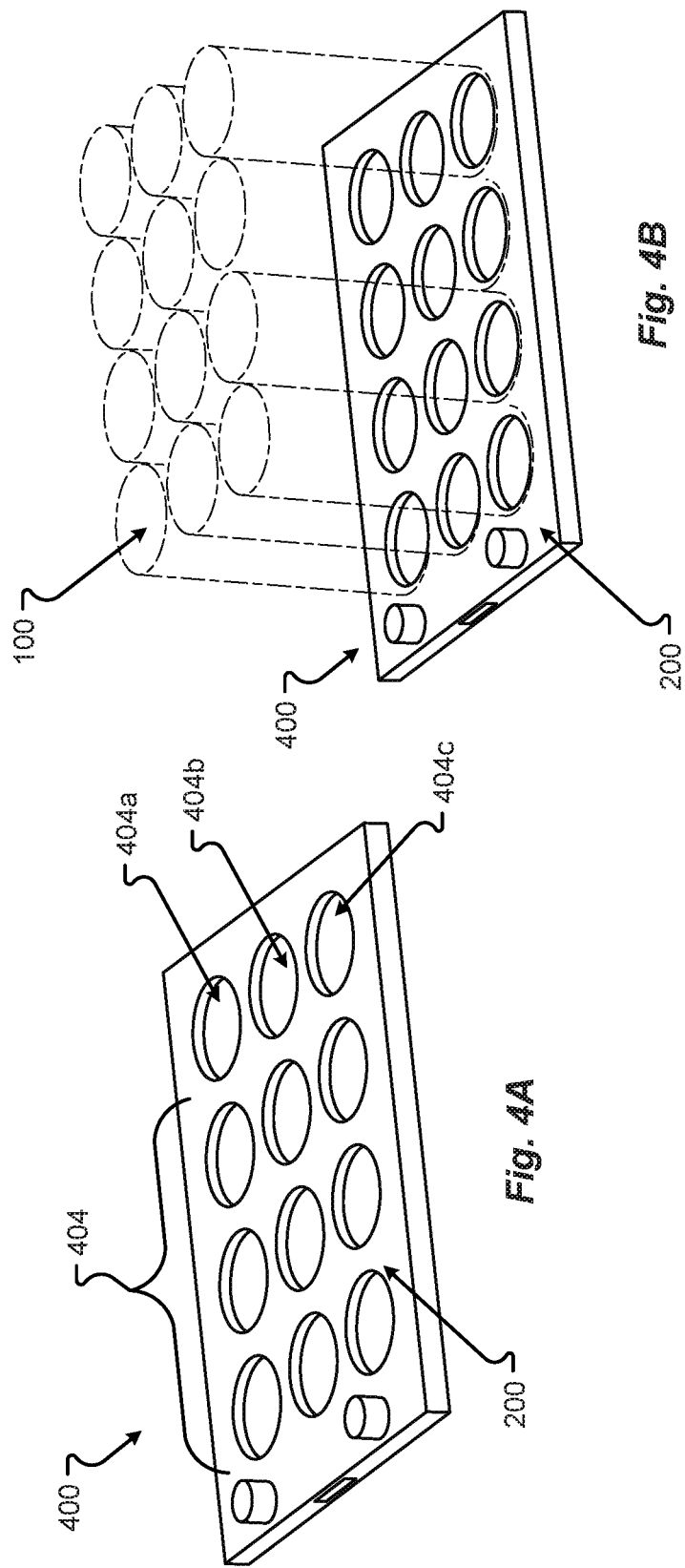

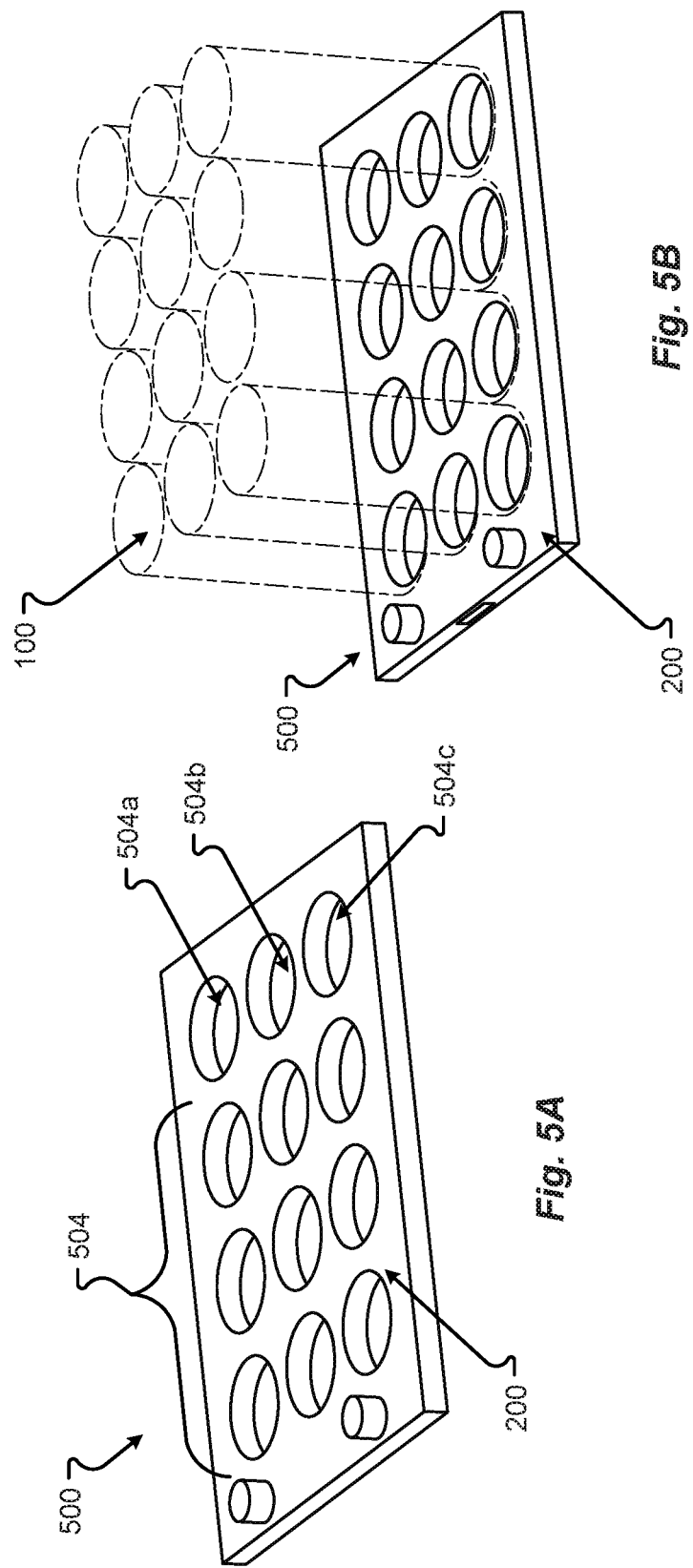

BATTERY CELL COOLING PLATE WITH CELL VENTS

FIELD

The present disclosure is generally directed to battery module construction, and more particularly to a cooling plate configuration.

BACKGROUND

In recent years, transportation methods have changed substantially. This change is due in part to a concern over the limited availability of natural resources, a proliferation in personal technology, and a societal shift to adopt more environmentally friendly transportation solutions. These considerations have encouraged the development of a number of new flexible-fuel vehicles, hybrid-electric vehicles, and electric vehicles.

Vehicles employing at least one electric motor and power system store electrical energy in a number of battery cells. These battery cells are typically connected to an electrical control system to provide a desired available voltage, ampere-hour, and/or other electrical characteristics. Advances in battery technology have resulted in the increasing use of large batteries, comprising tens, hundreds, or even thousands of individual cells, for applications such as powering various electrical components of vehicles (including vehicles designed for travel over land and water and through the air) and storing electricity generated using renewable energy sources (e.g. solar panels, wind turbines).

Many of the batteries described above include a vent to exhaust gasses if the battery overheats. The vents help prevent catastrophic failure of the battery that could result in the explosion of the battery cell. Further, some battery designs incorporate numerous cells into a module. The battery modules often need to be cooled to operate more efficiently or safely. To cool the battery cells, battery modules can include a plate or system to circulate a phase change material (PCM) or other liquid and/or gas to cool the plate, and as a result, the battery cells in contact with the plate. Unfortunately, the plate can interfere with the function of the battery vents.

BRIEF DESCRIPTION OF THE DRAWINGS

FIG. 3A is a perspective view of a cooling plate in accordance with embodiments of the present disclosure embodiment;

FIG. 3B is another perspective view of a cooling plate in accordance with embodiments of the present disclosure embodiment;

FIG. 3C is a plan view of a cooling plate in accordance with embodiments of the present disclosure embodiment;

FIG. 3D is a plan view of a cooling plate in accordance with embodiments of the present disclosure embodiment;

FIG. 3E is a plan view of a cooling plate in accordance with embodiments of the present disclosure embodiment;

FIG. 3F is a plan view of a cooling plate in accordance with embodiments of the present disclosure embodiment;

FIG. 4A is a perspective view of a cooling plate in accordance with embodiments of the present disclosure embodiment;

FIG. 4B is another perspective view of a cooling plate in accordance with embodiments of the present disclosure embodiment;

FIG. 5A is a perspective view of a cooling plate in accordance with embodiments of the present disclosure embodiment;

FIG. 5B is another perspective view of a cooling plate in accordance with embodiments of the present disclosure embodiment;

DETAILED DESCRIPTION

Figure 1B:
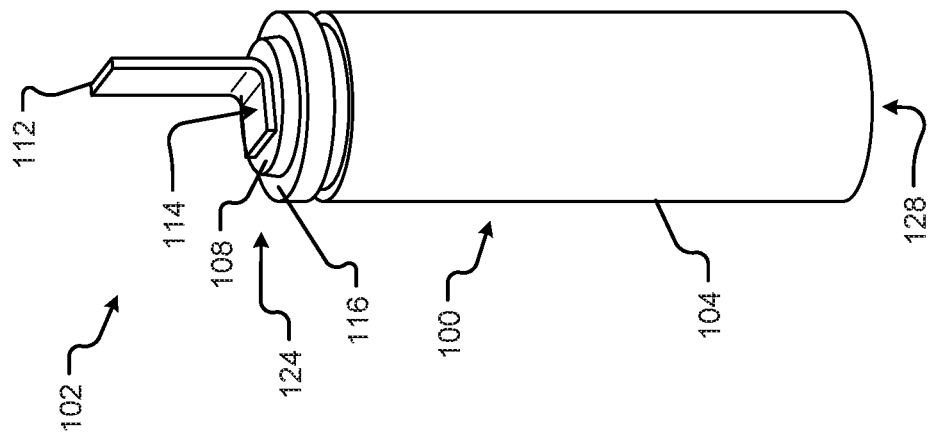
FIG. 1B is a perspective view of a battery cell in accordance with embodiments of the present disclosure.

Before any embodiments of the disclosure are explained in detail, it is to be understood that the disclosure is not limited in its application to the details of construction and the arrangement of components set forth in the following description or illustrated in the drawings. The disclosure is capable of other embodiments and of being practiced or of being carried out in various ways. Also, it is to be understood that the phraseology and terminology used herein is for the purpose of description and should not be regarded as limiting. The present disclosure may use examples to illustrate one or more aspects thereof. Unless explicitly stated otherwise, the use or listing of one or more examples (which may be denoted by "for example," "by way of example," "e.g.," "such as," or similar language) is not intended to and does not limit the scope of the present disclosure.

Battery cells with bottom vents need to have a clear, unobstructed path to allow venting from the bottom bent. If the cell is cooled by a cold plate on the bottom surface, the cold plate can obstruct the vent path and may need to raise the cell with standoffs. This configuration is inefficient for cooling the battery cells because the thermal path from the battery cells to the cold plate is more restrictive due to thickness changes. Typically, cold plates have turbulence creators to promote circulation and heat absorption. These turbulence makers could be aligned with the bottom of the cell vents, thus creating a hole or dimple under a small portion of the vent. This will allow the vent to partially open and pass gas through the channel and out of the cell. In further configurations, a hole or cutout in the cooling plate can be positioned beneath the battery cell to allow the battery cell to vent.

Figure 1A:
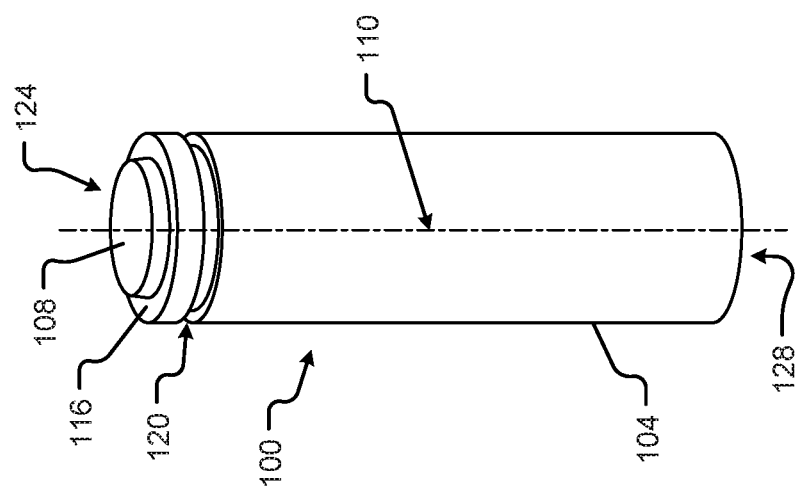
FIG. 1A is a perspective view of a battery cell in accordance with embodiments of the present disclosure.

Referring now to FIGS. 1A and 1B, a perspective view of a battery cell 100 is shown in accordance with embodiments of the present disclosure. The battery cell 100 may comprise a body 104, a top portion 124, a bottom portion 128, and a first terminal 108 and a second terminal (not visible). In some configurations, the first terminal 108 may correspond to a positive terminal disposed at the top portion 124 of the battery cell 100. In some configurations, the second terminal may correspond to the negative terminal. The second terminal may be disposed opposite the positive terminal (e.g., at the bottom portion 128 of the battery cell 100). In other configurations, the second terminal may be disposed on a side of the battery cell 100 other than the bottom portion 128.

The first terminal 108 may be insulated from the second terminal, or other part of the battery cell 100, via an insulation area 116. The insulation area 116 may be configured to electrically isolate the first terminal 108 from the second terminal, body 104, or other part of the battery cell 100. In some configurations, the insulation area 116 may be made from a plastic, cardboard, paper, linen, composite, or other non-conductive material.

The battery cell 100 may be substantially cylindrical in shape. Additionally or alternatively, the battery cell 100 may be symmetrical about at least one axis. For example, the battery cell 100 may be substantially symmetrical about a center axis 100 running from the top portion 124 to the bottom portion 128. The battery cell 100 may include one or more manufacturing features 120 including, but in no way limited to, indentations, alignment marks, reference datum, location features, tooling marks, orientation features, etc., and/or the like. As shown in FIG. 1A, the manufacturing feature 120 of the battery cell 100 may be a rolled, or sealed, portion of the battery cell 100 (e.g., disposed near a top portion 124 of the battery cell 100).

In any event, the battery cell 100 may be configured to store energy via one more chemicals contained inside the body 104. In some configurations, the battery cell 100 may be rechargeable and may include one or more chemical compositions, arrangements, or materials, such as, lithium-ion, lead-acid, aluminum-ion, nickel-cadmium, nickel metal hydride, nickel-iron, nickel-zinc, magnesium-ion, etc., and/or combinations thereof. The positive terminal of the battery cell 100 may correspond to the cathode and the negative terminal may correspond to the anode. When connected to a busbar, current from the battery cell 100 may be configured to flow from the terminals of the battery cell 100 through the busbar to one or more components of an electric power distribution system. This current flow may provide power to one or more electrical elements associated with an electric vehicle.

FIG. 1B shows a perspective view of a weldable battery cell 100 including a terminal tab 112 connected to the first terminal 108. The terminal tab 112 may be connected to a busbar that extends between adjacent battery cells 100 in a battery module. In other configurations, the terminal tab 122 represents a portion of the busbar, where the other portions of the busbar are not shown. Regardless, the following description can be adapted to other types of busbars.

The terminal tab 112 is shown attached to the first terminal 108 at a first attachment point 114. In some configurations, the attachment may include welding, brazing, or soldering the terminal tab 112 to the first terminal 108 of the battery cell 100. Although shown as connected at the top 124 of the battery cell 100, the terminal tab 112 may be connected to different ends, portions, or areas, or parts of the battery cell 100 that are separated by at least one insulation area 116.

In some configurations, the terminal tab 112 may be configured as a flat solid metal connector. The flat solid metal connector may be made from a conductive material or coating including, but in no way limited to, copper, aluminum, gold, silver, platinum, iron, zinc, nickel, etc., and/or combinations thereof. The flat solid metal connector may be bent along an unattached portion of a planar surface of the tab 112 and configured to extend from at least one surface of the weldable battery cell 100. As shown in FIG. 1B, the terminal tab 112 may be bent to extend in the same axial direction, and/or parallel to the center axis 100, of the weldable battery cell 100.

Figure 1C:
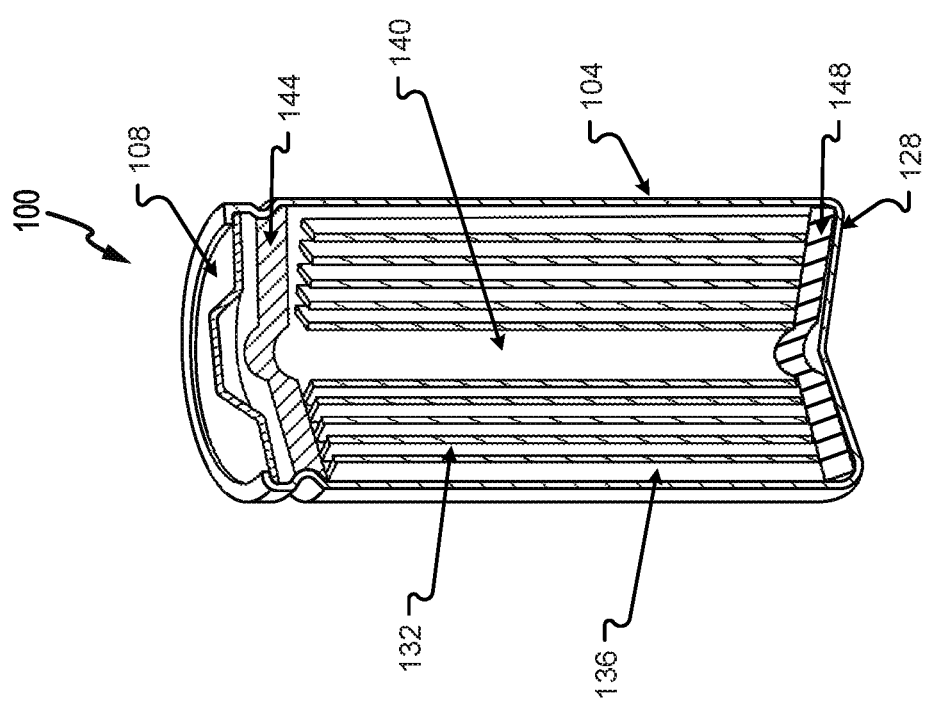
FIG. 1C is an interior view of the battery cell in accordance with embodiments of the present disclosure.

An example of a cross section of the battery cell 100 may be as shown in FIG. 1C. The battery cell 100 can be any type of battery such as a lithium ion battery, nickel-metal hydride, etc., as described above. The cathode and anode may be formed in sheets 132, 136 wrapped around a central core 140. The battery 100 can have top cap 108, which may form a first terminal, and a second terminal which may be formed from the body 104 of the battery or the bottom 128 of the battery 100. To prevent overheating or catastrophic failure of the battery 100, the battery 100 may include one or more vents. For example, a top vent 144 may be formed in the top 116 to allow explosive/expansive gases to be exhausted from the battery core. In some batteries, there's also a bottom vent 148. The bottom vent 148 may also help for the venting of gases through the bottom 128 of the battery 100. To enable the more efficient use of the battery 100, the battery 100 may need to be cooled in some configurations or situations An embodiment of a cooling plate 200, which may be used to cool the battery cells 100, may be as shown in FIG. 2. The cooling plate 200 may hold two or more cells 100a-100d, as shown in FIG. 2. The cells 100 may be joined, attached, adhered, etc. to the cooling plate 200. Thus, the battery cells 100 can be laser welded, adhesively adhered, or mechanically attached to the cooling plate 200. While the cooling plate 200 may cool the battery cells 100, the cooling plate 200 does not conduct electricity or interfere with the operation of the battery cells 100.

The cooling plate 200 can include a top section 212, a bottom section 224, a first end 216, second end 228, a first side 220, and a second side 232. The top 212, bottom 224, sides 220, 232 and/or ends 216, 228 may be formed from the same or different materials bonded, fused, adhered, attached, etc., together to form the cooling plate. Each of the top 212, bottom 224, sides 220, 232 and/or ends 216, 228 may be formed from a thermally conductive material, for example, one or more of, but not limited to, acrylic glass (e.g., Plexiglas V045i), aluminum or aluminum alloys, Copper, some types of fiberglass or foam-glass, manganese, magnesium, alloys, iron, silver, gold, steel, tin, titanium, alloys of the metals above, etc. Any material that is high in thermal conductivity, low in electrical conductivity, non-corrosive, air/liquid-tight, rigid, allows for the attachment of the cells 100, and workable may be better suited to form the cooling plate 200.

Figure 2A:
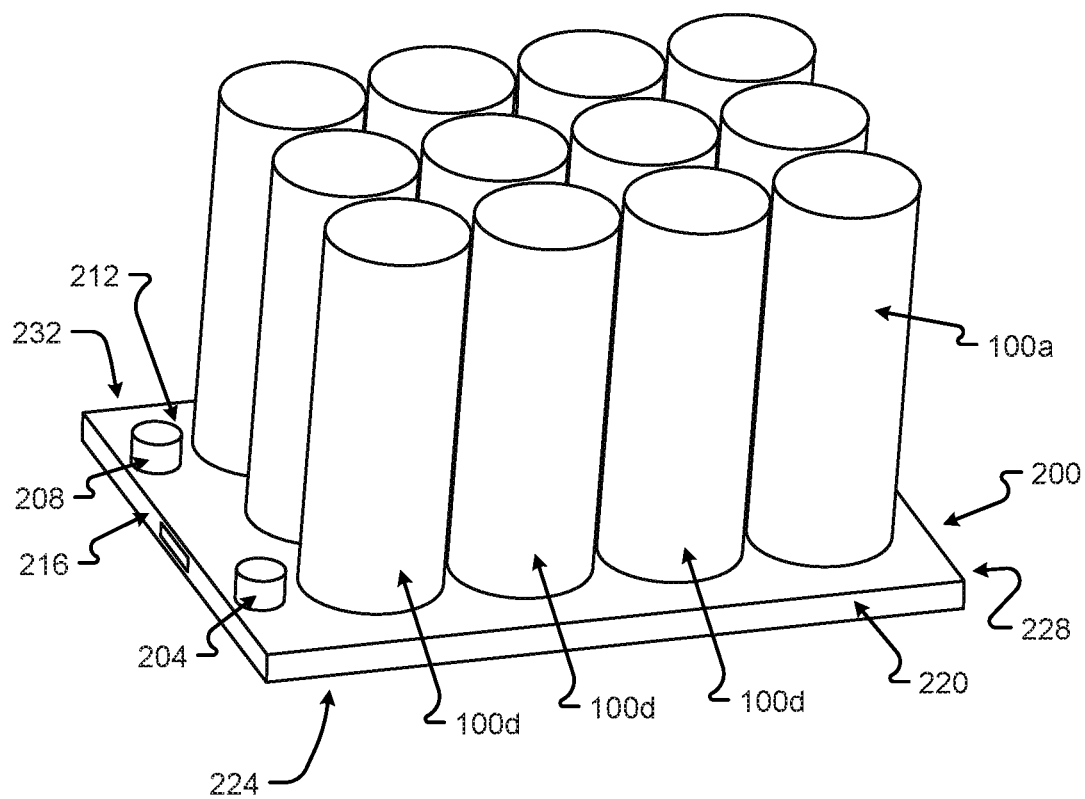
FIG. 2A shows a cooling plate having a plurality of cells physically connected thereto in accordance with embodiments of the present disclosure.
Figure 2B:
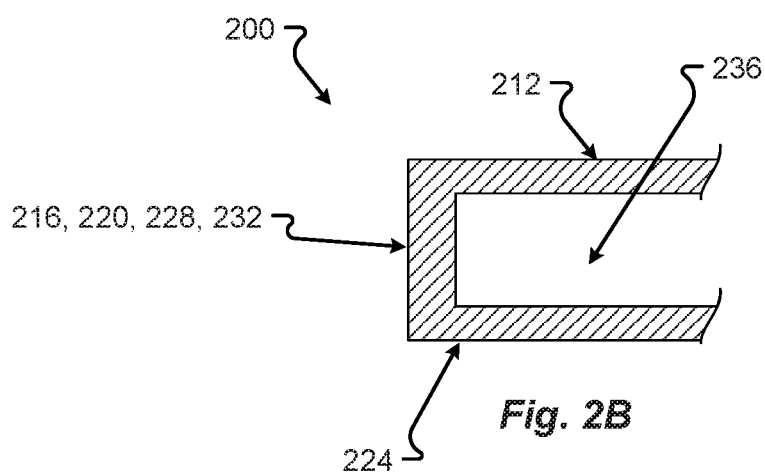
FIG. 2B shows a cross section of the cooling plate in accordance with embodiments of the present disclosure.

As shown in FIG. 2B, the formation of the top 212, bottom 224, sides 220, 232 and/or ends 216, 228 can form a hollow chamber 236 under or within the cooling plate 200. This hollow chamber 236 may allow for the flow or distribution of a cooling fluid or phase change material (PCM) within the hollow chamber 236 that can cool the top 212, bottom 224, sides 220, 232 and/or ends 216, 228.

A PCM can be a substance with a high heat of fusion which, melting and solidifying at a certain temperature and is capable of storing and releasing large amounts of energy. Heat is absorbed or released when the material changes from solid to liquid and vice versa; thus, PCMs are classified as latent heat storage (LHS) units. Types of cooling fluid or PCM can include, but is not limited to, glycol (or a mixture of glycol and water, for example, a 50/50 mixture), paraffin, salt hydrates, lauric acid, Trimethylolethane (TME), water, fatty acids, esters, a refrigeration (for example R134a), etc., or other types of liquids or PCMs. The PCM or liquid may enter through a first port 204 and exit through a second port 208. Thus, a constant circulation of cooling fluid may be provided through the interior of the cooling plate 200, which then cools the plate 200 and, through conduction, cools the battery cells 100.

Figure 2C:
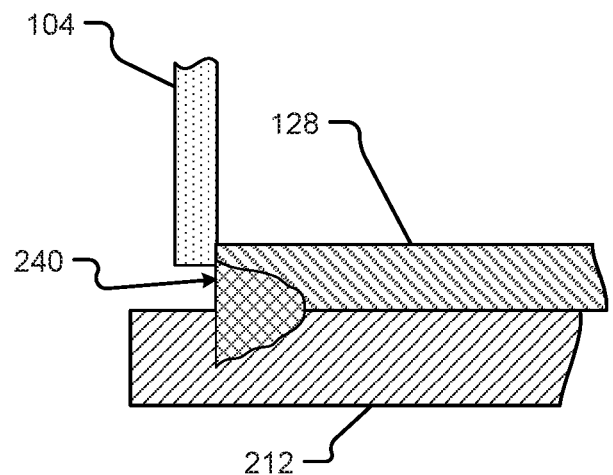
FIG. 2C shows a cross section of the welded attachment of the battery cell to the cooling plate in accordance with embodiments of the present disclosure.
Figure 2D:
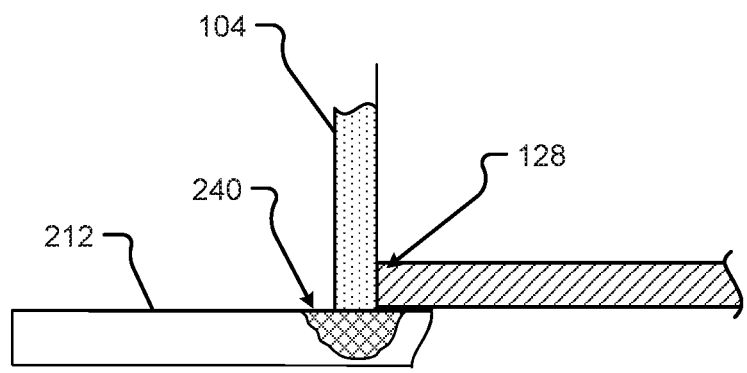
FIG. 2D shows another cross section of the welded attachment of the battery cell to the cooling plate in accordance with embodiments of the present disclosure.

At least two configurations for the attachment of the cells 100 to the cooling plate 200 may be as shown in FIGS. 2C and 2D. Depending on whether the bottom 128 of the cell 100 of the side 104 of the cell 100 protrudes from the bottom of the battery cell 100, the cell 100 can be attached by the bottom 128 of the cell 100 (as shown in FIG. 2C) or by the side 104 of the cell 100 (as shown in FIG. 2D. The attachment may be made by various methods, including, but not limited to, laser welding, arc welding, adhering with an adhesive or compound, physical attachment, etc. In some configurations, the cell 100 may be electrically isolated from the plate 200 by the incorporation of an insulator or insulative material at the attachment point(s) of the cell 100 to the plate 200. In the examples shown in FIGS. 2C and 2D, a laser weld 240 attaches the battery cell 100, either by the bottom 128 or the side 104 to the cooling plate 200. Regardless of the type of attachment or location of the attachment, the method and placement of the attachment cannot interfere with the bottom vent 148 venting to atmosphere or to a containment void or space in the cooling plate 200, as described hereinafter.

Figure 3G:
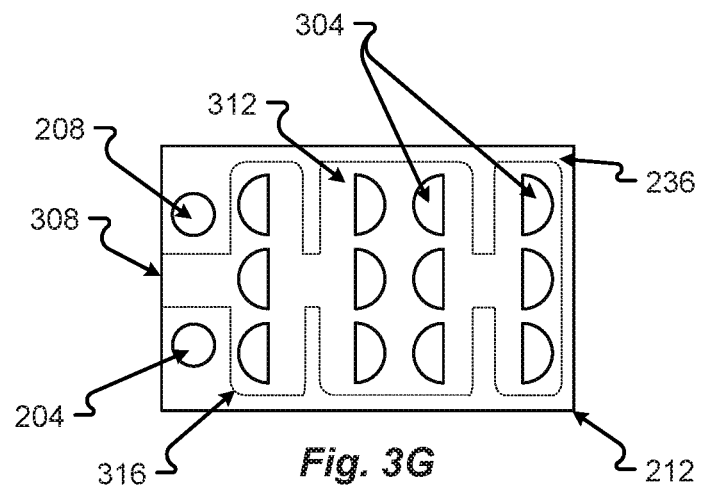
FIG. 3G is a plan view of a cooling plate in accordance with embodiments of the present disclosure embodiment.

A first configuration 300 for the cooling plate 200 may be as shown in FIGS. 3A-3H. FIGS. 3A and 3B show perspective views of the configuration 300 of the cooling plate 200. FIGS. 3C, 3D, 3E, 3F, 3G, and 3H show the first end 216 view, first side 220 view, second end 228 view, second side 232 view, top 212 view, and bottom 224 view, respectively, of first configuration 300 of the cooling plate 200. In the first configuration 300, the cooling plate 200 may have one or more openings, e.g., openings 304a-304c. These openings 304 may correspond to or align with the battery vent 148 at the bottom 128 of the battery cell 100. As shown in FIGS. 3A-3H, the opening or vent 304 may partially cover the bottom 128 of the battery cell 100. In some situations or battery cell designs, the battery cell 100 may have a bottom vent 148 that only vents to a portion and/or to one side of the bottom section 128 of the cell 100. As such, only a partial vent 304 is needed underneath the battery cells 100. While the shape of the opening 304 is a half-moon or crescent shape, the design of the openings 304 is not so limited as other shapes are possible based on the configuration of the vent 148.

Figure 3H:
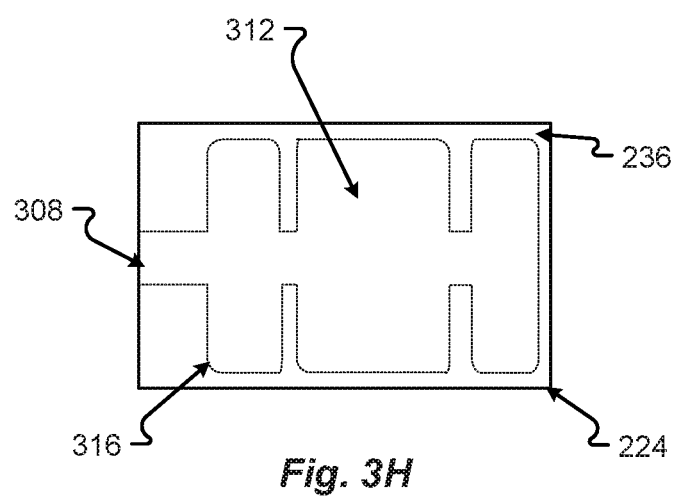
FIG. 3H is a plan view of a cooling plate in accordance with embodiments of the present disclosure embodiment.
Figure 4C:
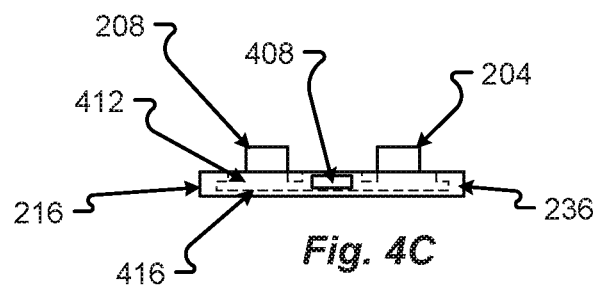
FIG. 4C is a plan view of a cooling plate in accordance with embodiments of the present disclosure embodiment.
Figure 4D:
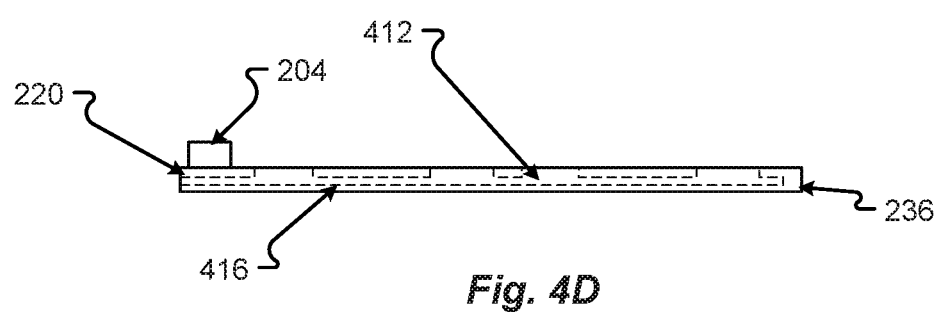
FIG. 4D is a plan view of a cooling plate in accordance with embodiments of the present disclosure embodiment.
Figure 4E:
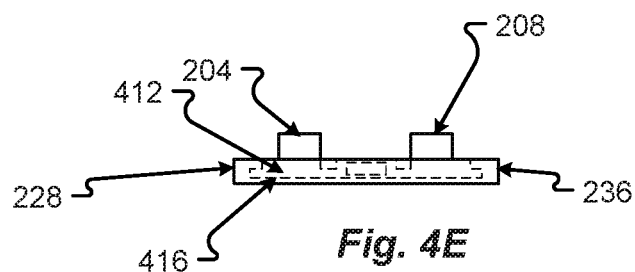
FIG. 4E is a plan view of a cooling plate in accordance with embodiments of the present disclosure embodiment.
Figure 4F:
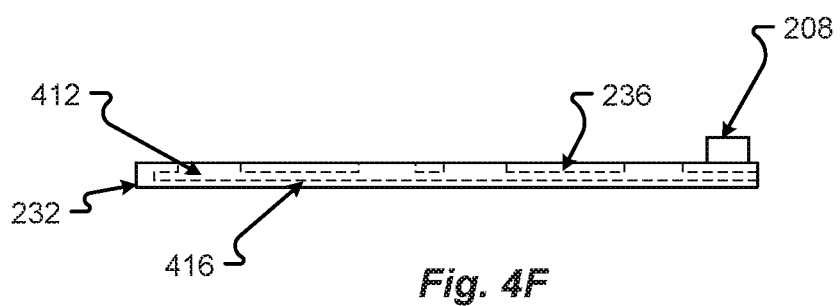
FIG. 4F is a plan view of a cooling plate in accordance with embodiments of the present disclosure embodiment.
Figure 4G:
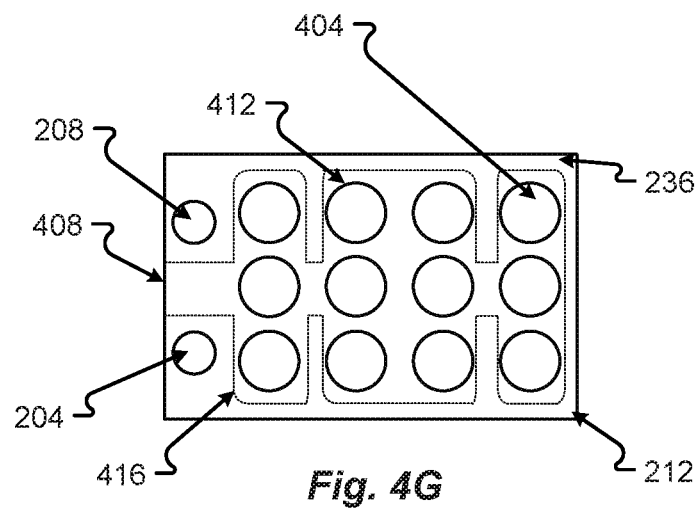
FIG. 4G is a plan view of a cooling plate in accordance with embodiments of the present disclosure embodiment.
Figure 4H:
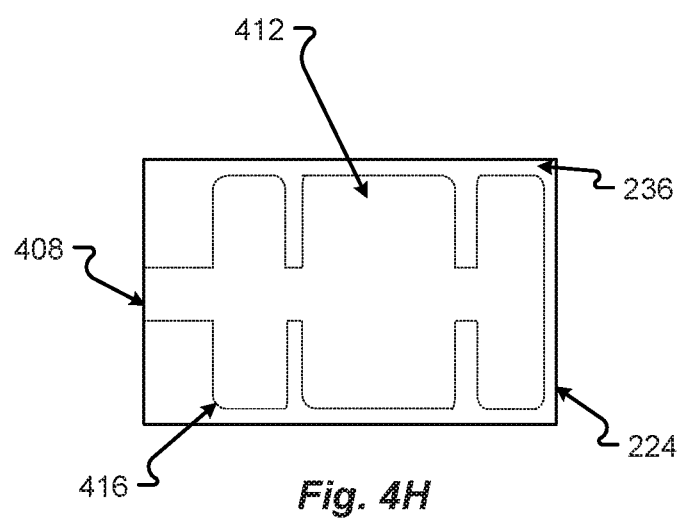
FIG. 4H is a plan view of a cooling plate in accordance with embodiments of the present disclosure embodiment.
Figure 5C:
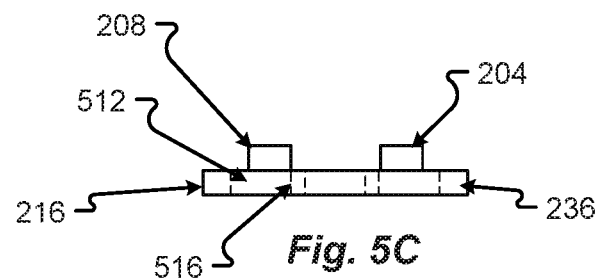
FIG. 5C is a plan view of a cooling plate in accordance with embodiments of the present disclosure embodiment.
Figure 5D:
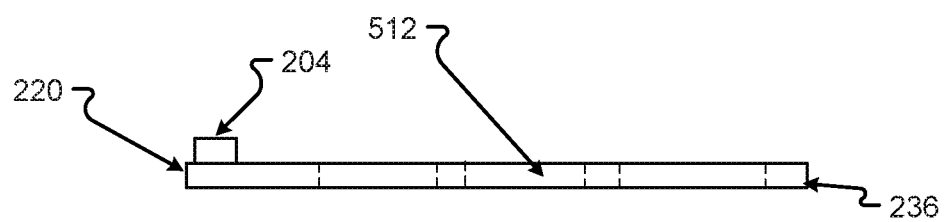
FIG. 5D is a plan view of a cooling plate in accordance with embodiments of the present disclosure embodiment.
Figure 5E:
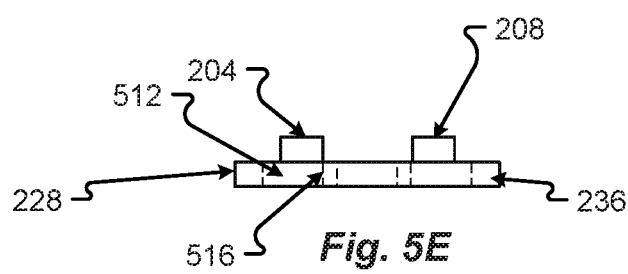
FIG. 5E is a plan view of a cooling plate in accordance with embodiments of the present disclosure embodiment.
Figure 5F:
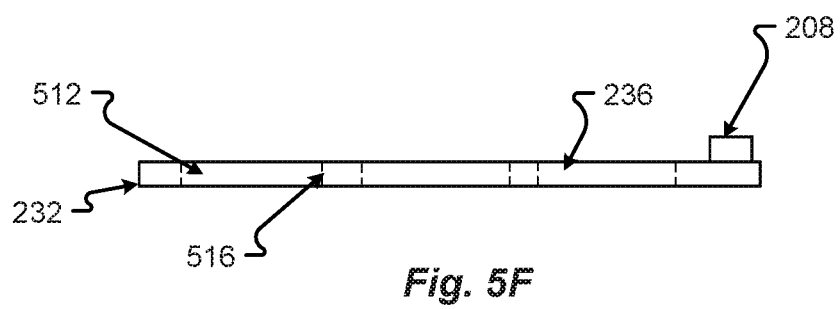
FIG. 5F is a plan view of a cooling plate in accordance with embodiments of the present disclosure embodiment.
Figure 5G:
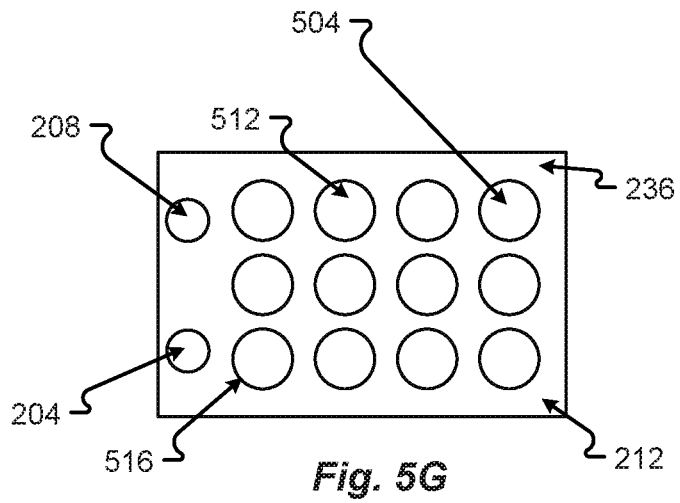
FIG. 5G is a plan view of a cooling plate in accordance with embodiments of the present disclosure embodiment.
Figure 5H:
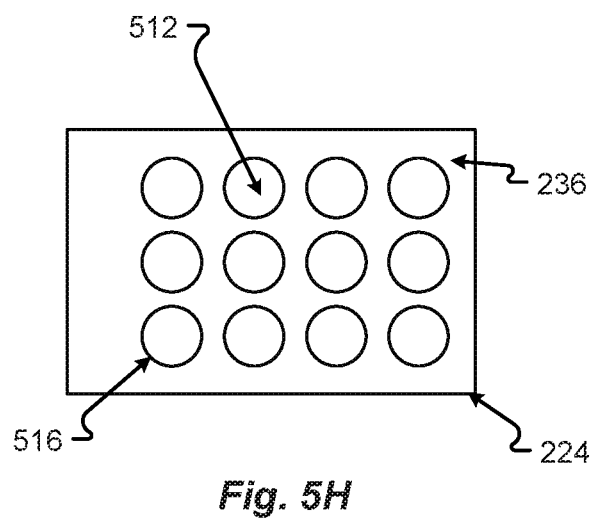
FIG. 5H is a plan view of a cooling plate in accordance with embodiments of the present disclosure embodiment.

In the configuration 300, the cooling of the cells 100 is quicker and/or more efficient as more surface area is in contact between the cooling plate 200 and the battery cell 100. Further, the cooling plate 300 may include a vent chamber 312, outlined by dashed line(s) 316, within the cooling plate 200. For example, an exemplary vent chamber 312 may be as shown in FIGS. 3C-3H. The vent chamber 312 can occupy a portion of the chamber 236. For example, the vent chamber may be formed around the openings 304 and form a continuous space to vent opening 308. The vent chamber 312 can be formed in a portion of the vertical area of the chamber 236 between the top 212 and bottom 224, as shown in FIGS. 3C-3F and/or a portion of the horizontal area between the ends 216, 228 and the sides 220, 232, as shown in FIGS. 3G and 3H. The shape or volume of the vent chamber 312 is not limited to that shown in FIGS. 3C through 3H, but can take other shapes or volumes based how much volume may be necessary to vent the battery cell(s) 100 and still allow the cooling plate 200 to cool the cell(s) 100. The vent chamber walls 316 can be made of the same or similar material as the cooling plate 200, as described above.

The venting chamber 312 may surround the vents 304 and exhaust any outgassing through a port 308 in one of the ends, e.g. 216 or 228, or vent through a bottom 224 or sides 220, 232 of the cooling plate 200. In this way, the other chamber 236 for cooling liquid 316 within the cooling plate 200 can cycle the cooling liquid or PCM while the venting chamber 312 allows for the venting of gas due to outgassing from one or more of the battery cells 100.

Another configuration 400 for the cooling plate 400 may be as shown in FIGS. 4A-4H. In this configuration 400, the vent openings 404A-404C may be full circular sections or round compared to the half-circle sections 304 shown in FIGS. 3A-3H. These vents 404 may allow for the attachment of battery cells 100 that have different vent configurations (e.g., vents circumscribing the bottom 128 of the battery, 100) that may completely vent from the bottom 128 or have a configuration where more area is needed to open the vent 148 to an interior venting chamber 412. Thus, the cooling plate 200, as shown in FIG. 4, has a similar cooling chamber 236 within the cooling plate 200 and can also include a venting chamber 412, similar to or the same as chamber 312, described in conjunction with FIGS. 3A-3H. Further, the venting chamber 412, defined by lines 416, can exhaust from a port 408, similar to or the same as port 308 described in conjunction with FIGS. 3A-3H.

Still a further configuration of the cooling plate 500 may be as shown in FIGS. 5A-5H. In this example, the vents 504A-504C may vent completely through the cooling plate 200 to the bottom 224 of the cooling plate 200. As such, the vented gas can pass through the cooling plate 200 to atmosphere in each vent 504 rather than being funneled through a chamber (e.g., chamber 312 and/or 412) within the cooling plate 500. Thus, each one of the openings is a separate vent 504 defined by dashed and solid lines 516.

Figure 6:
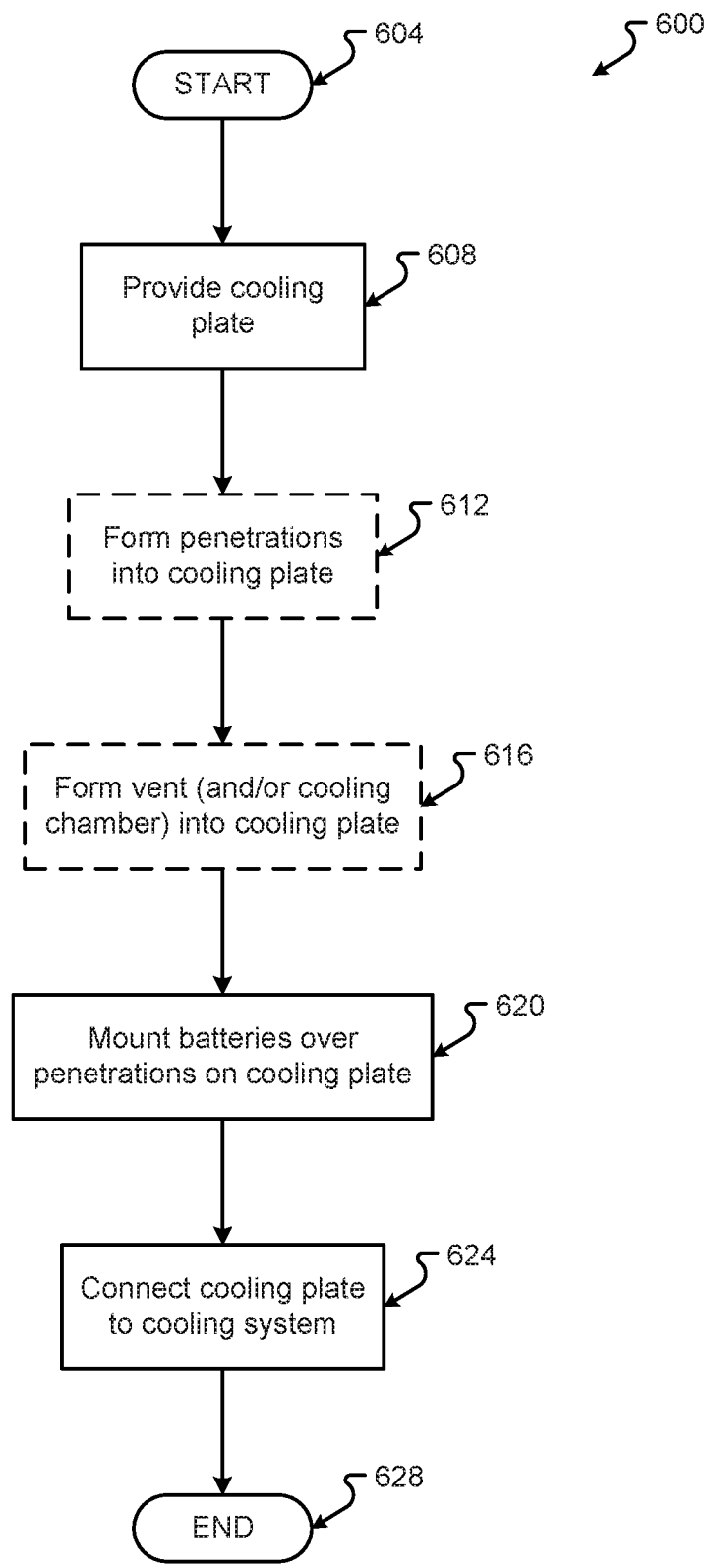
FIG. 6 provides a flowchart for a method of venting a battery cell through a cooling plate in accordance with embodiments of the present disclosure.

An embodiment of a method 600 for creating the venting or cooling plate 200 with mounted batteries may be as shown in FIG. 6 in accordance with embodiments of the present disclosure. While a general order for the steps of the method 600 is shown in FIG. 6, the method 600 can include more or fewer steps or can arrange the order of the steps differently than those shown in FIG. 6. Generally, the method 600 starts with a start operation 604 and ends with an end operation 628. The method 600 can be executed as a set of computer-executable instructions executed by a controller 340, and/or computer system, and encoded or stored on a computer readable medium or memory 344. Hereinafter, the method 600 shall be explained with reference to the systems, components, assemblies, devices, environments, etc. described in conjunction with FIGS. 1-5H.

In step 608, the cooling plate may be provided. The plate may be one of the configurations or a similar configuration as to those shown in FIGS. 2-5H. The cooling plate 200 may have penetrations 304, 404, 504 previously formed within the cooling plate 200 or may be formed, in optional step 612, into the top portion 212 or completely through the mounting plate, as shown in FIGS. 5A-5H. Forming the penetrations may include processes to mill, punch, cut, etc. the openings 304, 404 through the top portion 212 and/or the bottom portion 224. The penetration, if only in the top 212, may require a chamber 312 and a vent 308 to an end 216, 228, side 220, 232, and/or bottom 224 of the cooling plate 200. The vent 308 is formed in optional step 616. The vent 308 may be as shown in FIG. 3C. The process 616 may including manufacturing operations, for example, milling a hole through the side 216, 228 and/or bottom 224 of the cooling plate 200.

After the penetrations 304, 404, 504, and/or vents 308 are formed, the batteries 100 may be mounted, in step 620. Mounting the batteries 100 may include manufacturing process to join, adhere, weld, mechanically attach, etc., the batteries 100 to the cooling plate 200. The configuration of the mounting of the batteries 100 allows for heat conduction to occur between the battery 100 and the cooling plate 200 but prevents electrical conduction between the battery 100 and cooling plate 200. As such, some configurations may include an electrically insulating spacer between the battery 100 and the cooling plate 200. However, the spacer can be heat conductive. In some instances, the configuration of the mounting of the batteries 100 to the cooling plate 200 can include a weld or mounting design that does not affect the cathode or anode connections at any terminal 128, as described in conjunction with FIGS. 2C and/or 2D. Upon mounting the batteries 100, the cooling plate 200 may be connected to the cooling system (not shown), in step 624. For example, the hoses or pipes are mounted to the intake 204 and/or outtake 208 to allow for the circulation of glycol or PCM to cool the cooling plate, and as a result, the batteries 100.

The features of the various embodiments described herein are not intended to be mutually exclusive. Instead, features and aspects of one embodiment may be combined with features or aspects of another embodiment. Additionally, the description of a particular element with respect to one embodiment may apply to the use of that particular element in another embodiment, regardless of whether the description is repeated in connection with the use of the particular element in the other embodiment.

Examples provided herein are intended to be illustrative and non-limiting. Thus, any example or set of examples provided to illustrate one or more aspects of the present disclosure should not be considered to comprise the entire set of possible embodiments of the aspect in question. Examples may be identified by the use of such language as "for example," "such as," "by way of example," "e.g.," and other language commonly understood to indicate that what follows is an example.

The systems and methods of this disclosure have been described in relation to the connection of a battery to a cooling plate. However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should, however, be appreciated that the present disclosure may be practiced in a variety of ways beyond the specific detail set forth herein.

A number of variations and modifications of the disclosure can be used. It would be possible to provide for some features of the disclosure without providing others.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and/or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Embodiments of the present disclosure include a battery module comprising: a cooling plate comprising: a first chamber to circulate a first material that cools the cooling plate; an opening in a top portion of the cooling plate; a battery joined to the cooling plate over the opening, wherein a vent in a bottom of the battery vents through the opening in the cooling plate.

Any of the one or more of the above aspects, wherein the cooling plate is formed from a thermally conductive material.

Any of the one or more of the above aspects, wherein the opening is a circular shape.

Any of the one or more of the above aspects, wherein the cooling plate includes a second chamber opened to the opening.

Any of the one or more of the above aspects, wherein the second chamber is physically separate from the first chamber.

Any of the one or more of the above aspects, wherein the second chamber vents to a vent opening to an exterior of the cooling plate.

Any of the one or more of the above aspects, wherein the vent opening is in a side of the cooling plate.

Any of the one or more of the above aspects, wherein the cooling plate includes two or more openings.

Any of the one or more of the above aspects, wherein each of the two or more openings traverse the cooling plate to form a conduit from a top portion to a bottom portion of the cooling plate.

Any of the one or more of the above aspects, wherein the battery joined to the cooling plate by welding the battery to the cooling plate.

Embodiments of the present disclosure also include a method of creating a battery module, comprising: providing a cooling plate comprising: a first chamber to circulate a first material that cools the cooling plate; an opening in a top portion of the cooling plate; providing a battery cell comprising a vent included in a bottom of the battery cell; joining the battery cell to the cooling plate over the opening, wherein the vent in the bottom of the battery vents through the opening in the cooling plate.

Any of the one or more of the above aspects, wherein the cooling plate includes a second chamber opened to the opening.

Any of the one or more of the above aspects, wherein the second chamber is physically separate from the first chamber.

Any of the one or more of the above aspects, wherein the second chamber vents to a vent opening to an exterior of the cooling plate.

Any of the one or more of the above aspects, wherein the battery joined to the cooling plate by welding the battery to the cooling plate.

Embodiments of the present disclosure also include a battery module comprising: a cooling plate comprising: a top portion; a bottom portion; two ends; two sides; a first chamber to circulate a first material that cools the cooling plate formed interior to the top portion, bottom portion, two ends, and two sides; two or more openings, wherein each opening traverses the cooling plate to form a conduit from the top portion to the bottom portion of the cooling plate; two or more batteries, wherein each battery is joined to the cooling plate over one of the two or more openings, wherein a vent in a bottom of the battery vents through the opening in the cooling plate.

Any of the one or more of the above aspects, wherein the cooling plate is formed from a thermally conductive material.

Any of the one or more of the above aspects, wherein the opening is a circular shape.

Any of the one or more of the above aspects, wherein each of the two or more openings vents to an exterior of the cooling plate at a back of the bottom portion.

Any of the one or more of the above aspects, wherein the battery joined to the cooling plate by welding the battery to the cooling plate.

Any one or more of the aspects/embodiments as substantially disclosed herein.

Any one or more of the aspects/embodiments as substantially disclosed herein optionally in combination with any one or more other aspects/embodiments as substantially disclosed herein.

One or means adapted to perform any one or more of the above aspects/embodiments as substantially disclosed herein.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

What is claimed is:

1. A battery module comprising:
   a cooling plate comprising:
   a first chamber disposed within a body of the cooling plate to circulate a first material that cools the cooling plate;
   a second chamber disposed within a portion of the first chamber, wherein the second chamber is physically separate from the first chamber; and
   an opening in a top portion of the cooling plate that opens into the second chamber; and
   a battery joined to the cooling plate over the opening, wherein a vent in a bottom of the battery vents through the opening in the cooling plate and into the second chamber.

2. The cooling plate of claim 1, wherein the cooling plate is formed from a thermally conductive material.

3. The cooling plate of claim 2, wherein the opening is a circular shape.

4. The cooling plate of claim 2, wherein the opening is a half-circle closed shape disposed under half of the bottom of the battery.

5. The cooling plate of claim 2, wherein the first chamber comprises a vertical area disposed between a top and a bottom of the cooling plate, and wherein the second chamber is disposed in a portion of the vertical area of the first chamber.

6. The cooling plate of claim 2, wherein the second chamber vents to a vent opening to an exterior of the cooling plate.

7. The cooling plate of claim 6, wherein the vent opening is disposed in a side of the cooling plate.

8. The cooling plate of claim 2, wherein the cooling plate includes two or more openings.

9. The cooling plate of claim 8, wherein each of the two or more openings traverse the cooling plate to form a conduit from a top portion of the cooling plate through a bottom portion of the cooling plate.

10. The cooling plate of claim 1, wherein the battery is joined to the cooling plate by welding the battery to the cooling plate.

11. A method of creating a battery module, comprising:
    providing a cooling plate comprising:
    a first chamber disposed within a body of the cooling plate to circulate a first material that cools the cooling plate;
    a second chamber disposed within a portion of the first chamber, wherein the second chamber is physically separate from the first chamber; and
    an opening in a top portion of the cooling plate that opens into the second chamber;

providing a battery cell comprising a vent included in a bottom of the battery cell; and joining the battery cell to the cooling plate over the opening, wherein the vent in the bottom of the battery vents through the opening in the cooling plate and into the second chamber.

12. The method of creating a battery module of claim 11, wherein the opening is formed in a circular shape.

13. The method of creating a battery module of claim 11, wherein the first chamber comprises a vertical area disposed between a top and a bottom of the cooling plate, and wherein the second chamber is formed in a portion of the vertical area of the first chamber.

14. The method of creating a battery module of claim 11, wherein the second chamber vents to a vent opening to an exterior of the cooling plate.

15. The method of creating a battery module of claim 11, wherein the battery is joined to the cooling plate by welding the battery to the cooling plate.

16. A battery module comprising:
a cooling plate comprising:
a top portion;
a bottom portion;
two ends;
two sides;
a first chamber to circulate a first material that cools the cooling plate formed interior to the top portion, bottom portion, two ends, and two sides;
two or more openings, wherein each opening of the two or more openings is physically separate from the first chamber and traverses the cooling plate to form a conduit from the top portion to the bottom portion of the cooling plate through a portion of the first chamber; and
two or more batteries, wherein each battery of the two or more batteries is joined to the cooling plate over one of the two or more openings, and wherein a vent in a bottom of each battery vents through the one of the two or more openings and through the cooling plate.

17. The battery module of claim 16, wherein the cooling plate is formed from a thermally conductive material.

18. The battery module of claim 16, wherein each of the two or more openings is a circular shape.

19. The battery module of claim 16, wherein each of the two or more openings vents to an exterior of the cooling plate at a back of the bottom portion.

20. The battery module of claim 16, wherein each battery is joined to the cooling plate by welding each battery to the cooling plate.

* * * * *